Figure 1:
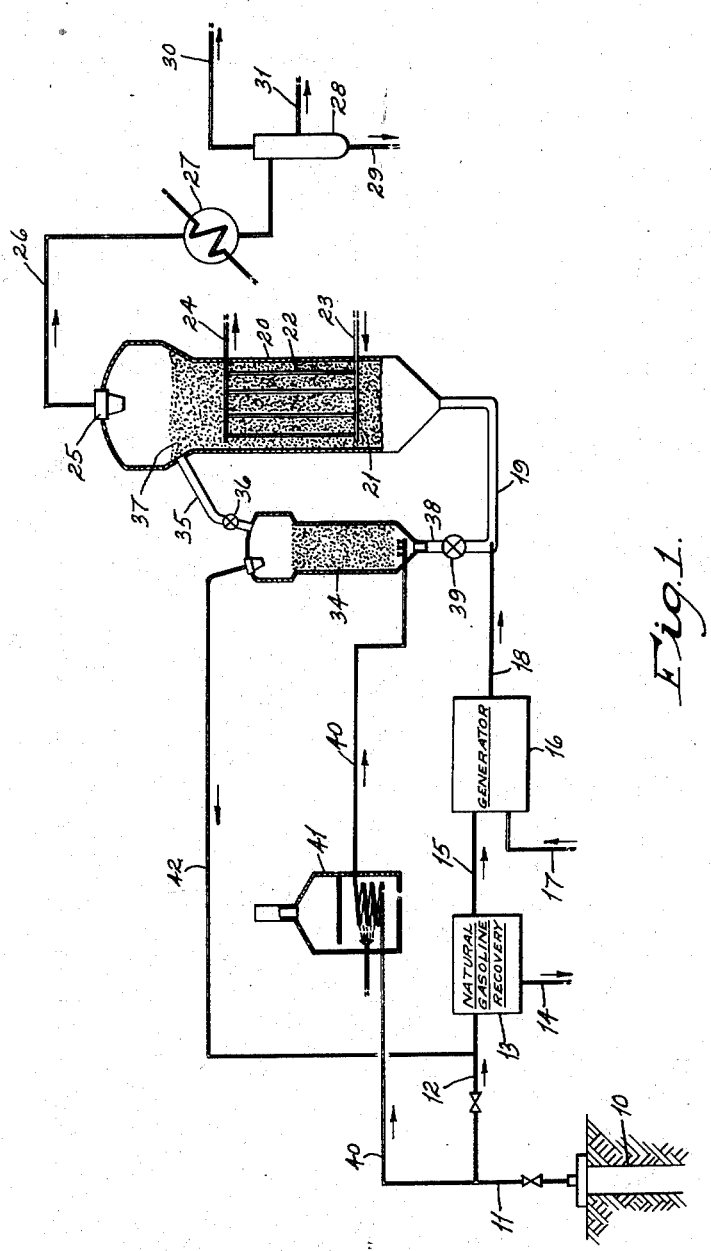

Oct. 17, 1950  E. W. RIBLETT  2,525,827
PRODUCING HYDROCARBONS BY THE CATALYTIC REDUCTION
OF CARBON MONOXIDE BY HYDROGEN
Filed July 19, 1947  2 Sheets-Sheet 2

INVENTOR.
EARL W. RIBLETT
BY
ATTORNEYS

UNITED STATES PATENT OFFICE 2,525,827

PRODUCING HYDROCARBONS BY THE CATALYTIC REDUCTION OF CARBON MONOXIDE BY HYDROGEN

Earl W. Riblett, Tenafly, N. J., assignor to Hydrocarbon Research, Inc., New York, N. Y., a corporation of New Jersey Application July 19, 1947, Serial No. 762,020

6 Claims. (Cl. 260—449.6)

The present invention relates to the synthesis of hydrocarbons, oxygenated hydrocarbons and the like, and is more specifically concerned with a stripping process recovering vaporizable deposits which accumulate upon, and impair the activity of, the synthesis catalyst when synthesis gas, i. e., a mixture of hydrogen and carbon oxide, is passed in contact therewith under reaction conditions.

More particularly, the present invention involves a synthesis process wherein a mixture of carbon monoxide and hydrogen is generated by the partial oxidation of natural gas from which the naturally occurring natural gasoline or like liquid hydrocarbon fractions have been separated. The synthesis gas is passed, in the usual manner, in contact with a synthesis catalyst under reaction conditions and the effluent gasiform reaction products are treated for the recovery of desired products. The present invention affords an improved yield by more or less continuously subjecting the catalyst employed in the synthesis reactor to treatment with wet natural gas to desorb or strip reaction products which have accumulated on the surfaces of the catalyst. The gaseous effluent from the stripping step accordingly comprises the natural gas, usually predominantly methane, the desorbed or stripped reaction products, and the original content of natural gasoline. This effluent is supplied as a unitary stream directly to the natural gasoline recovery system, wherein the normally liquid products ($C_4$ and higher) are separated from the gaseous stream. The residual gas which is rich in methane is conducted to the generator for the production of synthesis gas.

The term, wet natural gas, as generally known in the petroleum industry, is used in this specification and the appended claims to connote natural gas containing normally liquid hydrocarbons ($C_4$ and higher) in quantities commercially justifying their separation and recovery from the gas. In general, natural gas containing less than about 0.1 gallon of normally liquid hydrocarbons ($C_4$ and higher) per 1000 cubic feet (standard conditions) of gas is considered too lean in liquid hydrocarbons to permit their economic recovery and, therefore, is not referred to as a wet natural gas.

This invention has the important advantage of making available, fully adequate supplies of effective stripping gas to the catalyst stripping or purging step with subsequent recovery of the desorbed hydrocarbons and like products simultaneously with the liquid hydrocarbons originally present in the natural gas used as stripping medium. Moreover, stripping is accomplished without the necessity for providing additional product recovery or separating means to handle the separate stripping gases and without overburdening the normal product recovery system with the added volume of stripping gases.

The wet natural gas used in the process of the present invention may be derived from any producing well of the familiar types supplied from a sub-surface reservoir and containing typically varying quantities of natural gasoline ($C_4$ and higher hydrocarbons) in vapor form.

In accordance with the present invention, the stripping gaseous stream, after stripping absorbed hydrocarbons and the like from a synthesis catalyst, passes through a conventional plant for recovering therefrom natural gasoline; and the residual gases are converted by partial oxidation to synthesis gas, which is in turn converted to desired hydrocarbon products in a catalytic reaction zone. Catalyst is periodically or continuously removed and stripped in a separate zone with an additional portion of wet natural gas which is thereafter treated for the recovery of normally liquid products, and then used to supplement the feed to the generator of synthesis gas.

In order to more clearly illustrate the invention, reference is now made to the attached drawings illustrating more or less diagrammatically preferred process systems suitable for carrying out the present invention.

Therein Fig. 1 discloses a producing well 10 furnishing wet natural gas from a sub-surface reservoir, normally, a deep, high pressure source. The wet natural gas, including a typical content of natural gasoline ($C_4$ and high hydrocarbons), is delivered through valved pipe 11 as a gaseous stream passing, by way of valved branch pipe 12, to any suitable natural gasoline recovery system 13.

The natural gasoline recovery system, per se, forms no part of the present invention, and is therefore disclosed only diagrammatically. Suffice it to say that this system may comprise any conventional or known instrumentality for removing natural gasoline fractions from wet natural gas. Typical systems are the condensation system, involving application of pressure and cooling, the absorption system employing an absorbing oil, for example, seal oil, which extracts the desired liquid fractions and is in turn stripped thereof, and the adsorption system employing activated charcoal or like adsorbent.

In any case, the natural gasoline recovery system delivers, for further treatment or use as may be desired, a stream of normally liquid hydrocarbons and the like by way of pipe 14. The residual stripped or divested gases, substantially free of normally liquid constituents (C4 and higher), pass by way of outlet pipe 15 to the synthesis gas generator 16.

Gas generator 16 operates upon the conventional principles of partial combustion of carbonaceous material. Therefore, an oxidizing agent, such as relatively pure oxygen, is supplied to the generator by any convenient source by way of the inlet pipe 17. It will be appreciated, however, that the invention contemplates the substitution of other known oxidizing media, such for instance, as water vapor or carbon dioxide, or mixtures thereof with oxygen. While substantially pure oxygen is not essential, nevertheless, it is usually to be preferred as a means of eliminating undesirable nitrogen from the subsequent processing operations.

The product of the generator, synthesis gas comprising essentially hydrogen and carbon monoxide, passes by way of outlet pipe 18 to inlet conduit 19 of the synthesis reactor 20, picking up and entraining stripped or regenerated catalyst as will hereinafter appear in more detail, and passing directly into the bottom of reactor 20.

The reactor, illustrated only symbolically, includes a cylindrical body portion with a tapered lower extremity and contains a mass of powdered catalyst 21, preferably in a state of dense phase fluidization.

The catalyst mass is in contact with suitable cooling surfaces represented herein by heat exchanger 22, preferably of relatively streamlined form so as not to impair fluidization, and supplied with a coolant entering as at 23 and withdrawn as at 24.

The gasiform products of reaction pass through filter 25 and outlet pipe 26 to a recovery system employing a condenser 27 and a separator 28.

Any equivalent form of device for separating entrained catalyst particles may be substituted for the filter 25, such as for example, cyclone separators, or electrostatic or electromagnetic separators. Similarly, any other product recovery system may be substituted for the condenser and separator disclosed. In any event, the separation will yield aqueous products as at 29, normally gaseous products of reaction as at 30, and a liquid oil layer as at 31. The oil layer may be further treated for recovery of desired constituents or disposed of at any suitable point of utilization not shown, and the gasiform products of reaction may be treated or recycled or otherwise handled as may be desired.

Particular attention is now directed to the arrangement for regenerating and stripping the catalyst, comprising a stripping chamber 34, supplied more or less continuously with a predetermined stream of used or spent catalyst through upper standpipe 35, including a valve or feeder 36. The upper end of the standpipe 35 terminates below the pseudo-liquid level 37 of the catalyst mass in reactor 20.

Catalyst is continuously withdrawn from the lower portion of the stripping chamber 34 through lower standpipe 38 and mechanical feeder 39, and returned to conduit 19 as aforesaid. Accordingly, there is a continual circulation of catalyst from the reactor to the stripper and return.

Wet natural gas containing a typical recoverable proportion of natural gasoline passes from line 11 through pipe 40 and preheater 41 to the lower portion of the stripping chamber 34 to function as the stripping gas. Advantageously, the catalyst is herein likewise fluidized by adjusting the flow of stripping gas so that the catalyst assumes a condition resembling a boiling liquid. The catalyst particles are thus subjected to treatment with the natural gas under appropriate conditions for the desorption or volatilization of reaction products which have accumulated on the surfaces of the catalyst particles in the course of the synthesis reaction.

The effluent stripping gas, with the stripped products, passes through outlet pipe 42 which joins with the wet natural gas in line 12, entering the natural gasoline recovery system 13. Thus the feed to the natural gasoline system includes all of the hydrocarbons and like products stripped from the catalyst and these products are recovered along with the natural gasoline. If desired, the recovered liquid stream issuing at 14 may be fractionated.

It is to be understood that the present invention contemplates utilization of any of the conventional catalysts for the production of hydrocarbons, oxygenated hydrocarbons, or the like, by the catalytic reduction of carbon oxide with hydrogen. Typical catalysts are prepared from cobalt, iron, nickel, or ruthenium. In particular, I prefer to employ a powdered, active iron catalyst, properly reduced and conditioned and containing typical proportions of the usual activators or promoters, for example, alumina, thoria, zirconia, the oxides of the alkali metals, alkaline earth metals, or the like. While the invention has been specifically disclosed in connection with a fluidized contact mass, nevertheless, it is equally adapted to any system wherein the catalyst is separately stripped either continuously or intermittently, as desired. Any suitable conventional means may be employed to cause a bed of catalyst to pass cyclically through successive reaction and stripping zones, or in an extreme case, a reactor may be alternately operated on reaction and stripping cycles.

Figure 2:
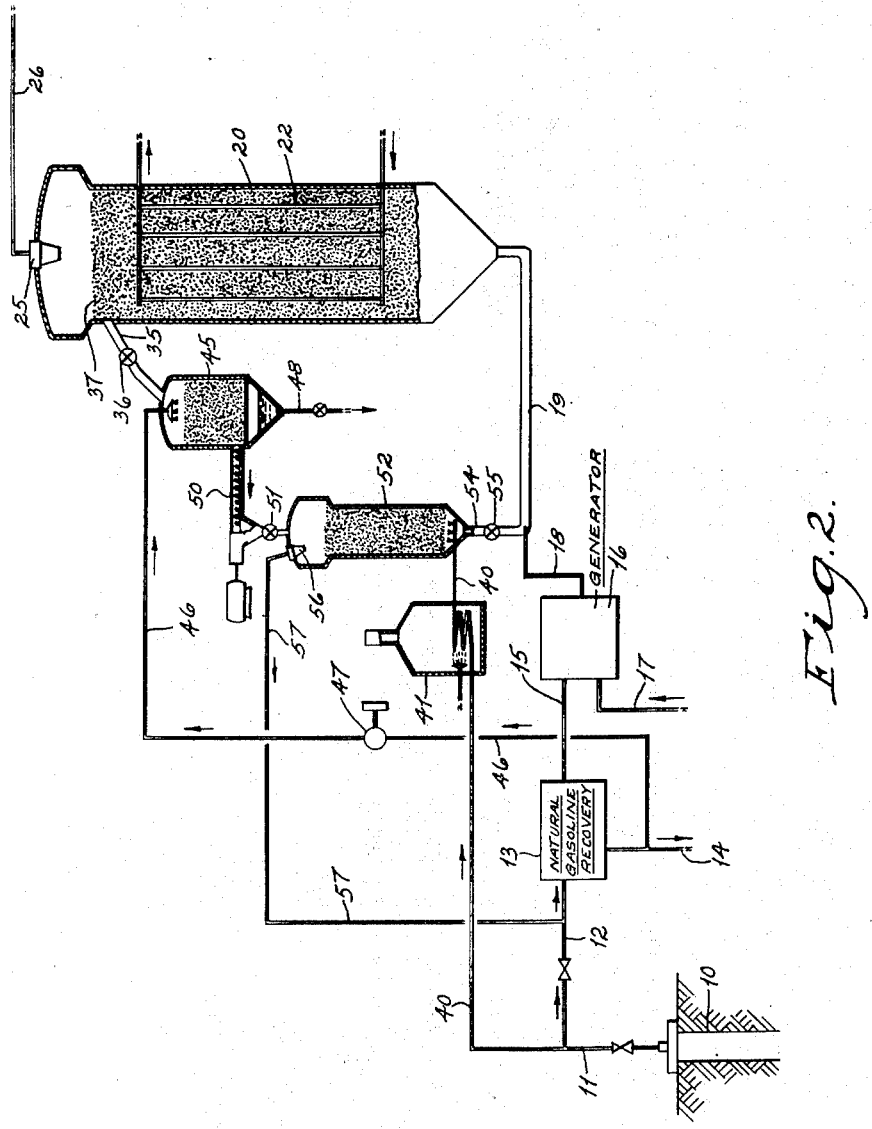

A modified arrangement is disclosed in Figure 2 of the attached drawings, wherein a portion of the liquid hydrocarbons separated from wet natural gas is employed to effect an initial washing of the catalyst to free it from waxy hydrocarbons and like reaction products not removable by stripping with a gaseous medium. Thereafter the wet catalyst is subjected to drying and stripping by means of wet natural gas to remove the liquid hydrocarbons used in the washing step.

This arrangement is particularly adaptable to those synthesis operations wherein the catalysts tend to accumulate high-boiling reaction products not well removed by simple gas stripping. To this end, catalyst from standpipe 35, controlled by feeder 36, first passes to an extraction chamber 45 where it is subjected to washing by a stream of natural gasoline introduced through pipe 46 and withdrawn with the aid of pump 47 from the aforementioned pipe 14 carrying the recovered natural gasoline.

The effluent liquid with the extracted reaction products is withdrawn from the extraction chamber 45 by pipe 48 and sent to any desired treatment step or point of utilization.

The washed catalyst is drawn by screw conveyor 50 to mechanical feeder 51 discharging into stripping chamber 52 wherein an upflow of preheated wet natural gas derived from the well pipe 11 by way of line 40 and preheater 41 serves to dry the catalyst and eliminate adsorbed material. The stripped catalyst particles are removed from the bottom of zone 52 by way of standpipe 54 and valve 55 and discharged into conduit 19 where they are picked up in the incoming synthesis gas stream.

Stripping zone 52 may be operated in fluidized condition for convenience of handling the catalyst. The stripping gases containing the stripped hydrocarbons and like reaction products pass through filter 56 and return line 57 to the inlet 12 of the natural gasoline plant wherein the liquid fractions are removed.

In accordance with one specific example carried out in equipment as indicated in Figure 1, a synthesis gas is formed by supplying natural gas, from which normally liquid hydrocarbons have been recovered, to a generator wherein the gaseous hydrocarbons are reacted with oxygen of about 95% purity and discharge as a synthesis gas containing essentially hydrogen and carbon monoxide in the molar ratio of approximately 2:1.

The synthesis gas is passed through a catalyst comprising active iron particles substantially entirely finer than 200 mesh, about 60% passing a 325 mesh screen, the catalyst being maintained in a state of dense phase fluidization by an upward linear flow of reactants equal to about 1.5 feet per second through the reaction zone. The reaction mass is held at a temperature of about 650° F. and under a pressure of about 250 pounds per square inch gauge. The hydrocarbon products of reaction recovered from the gasiform effluent of the contact mass comprise predominantly liquid hydrocarbons in the motor gasoline boiling range.

Catalyst is continuously circulated out of the reaction zone to a stripping chamber supplied with wet natural gas at a temperature of 600° F. The gas velocity is about 1 ft. per second, adequate to maintain the catalyst in a state of dense phase fluidization. The wet natural gas originally contains 0.35 gallon of $C_4$ and higher hydrocarbons per 1000 cubic feet (standard conditions) of gas. Average contact time between catalyst and the stripping gas is about 15 seconds and the effluent stripping gas with the stripped products is introduced into the natural gasoline recovery system used for recovering normally liquid hydrocarbons from the gas prior to charging into the generator for the production of synthesis gas.

The stripped catalyst is continuously returned to the synthesis reactor and is essentially free of adsorbed volatile hydrocarbons and, therefore, is in a state of high activity.

Obviously many modifications and variations of the invention, as hereinbefore set forth, may be made without departing from the spirit and scope thereof, and therefore only such limitations should be imposed as are indicated in the appended claims.

I claim:

1. In the production of hydrocarbons, oxygenated hydrocarbons and the like, wherein a synthesis gas comprising carbon monoxide and hydrogen is formed by partially oxidizing natural gas in a gas generating zone, the resulting synthesis gas is passed in contact with a mass of synthesis catalyst in solid particle form in a synthesis zone under conditions such that carbon monoxide and hydrogen are converted into the aforesaid desired products of reaction which are recovered in a synthesis product recovery zone, the catalyst during said reaction becoming contaminated with undesired deposits, including adsorbed reaction products, and wherein the contaminated catalyst is separately subjected to stripping in a stripping zone under conditions effective to remove said contaminating deposits, the steps comprising obtaining from a producing well, wet natural gas containing liquefiable hydrocarbons, splitting the wet natural gas into two streams, passing one of said split streams of wet natural gas containing said liquefiable hydrocarbons in vaporized form in contact with said contaminated catalyst in said stripping zone under conditions effective to strip said contaminating material therefrom, separately withdrawing the stripping effluent from said stripping zone, consisting essentially of said wet natural gas stripping stream containing said stripped contaminating products, passing said withdrawn stripping effluent together with the other split stream of wet natural gas, through a natural gasoline recovery plant wherein liquefiable hydrocarbons are removed, thereby avoiding overloading of the synthesis product recovery zone, and passing the residual stream of gaseous hydrocarbons to said zone of gas generation.

2. The method according to claim 1, wherein the said synthesis catalyst is maintained in fluid phase condition during contact with said wet natural gas stream.

3. The method according to claim 1, wherein the said synthesis catalyst comprises finely divided, solid particles containing iron.

4. The method according to claim 1, wherein the catalyst treated in said stripping zone is subsequently employed in said synthesis zone for conversion of synthesis gas into said desired products of reaction.

5. In the production of hydrocarbons, oxygenated hydrocarbons and the like, wherein a synthesis gas comprising carbon monoxide and hydrogen is formed by partially oxidizing natural gas in a gas generating zone, the resulting synthesis gas is passed in contact with a mass of synthesis catalyst in solid particle form in a synthesis zone under conditions such that carbon monoxide and hydrogen are converted into the aforesaid desired products of reaction which are recovered in a synthesis product recovery zone, the catalyst during said reaction becoming contaminated with undesired deposits, including adsorbed reaction products, and wherein the contaminated catalyst is separately subjected to treatment in a stripping zone under conditions effective to remove contaminating deposits, the steps comprising obtaining from a producing well, wet natural gas containing liquefiable hydrocarbons in vaporized form, splitting the wet natural gas into two streams, washing a portion at least of said contaminating deposits from the catalyst with a liquid hydrocarbon stream, thereafter passing one of said split streams of wet natural gas in contact with resulting catalyst in said stripping zone under conditions effective to strip the surface residue therefrom, separately withdrawing the stripping effluent from said stripping zone consisting essentially of said wet natural gas stripping stream containing said stripped products, passing said withdrawn stripping effluent, together with the other split stream of wet natural gas, through a natural gasoline recovery plant wherein liquefiable hydrocarbons are removed, thereby avoiding overloading of the synthesis product recovery zone, and passing the residual stream of gaseous hydrocarbons to said zone of gas generation.

6. The method according to claim 5, wherein the liquid hydrocarbon stream employed for washing the catalyst comprises a liquid fraction recovered by said natural gasoline recovery plant.

EARL W. RIBLETT.

REFERENCES CITED

The following references are of record in the file of this patent:

UNITED STATES PATENTS

| Number | Name | Date |
| --- | --- | --- |
| 1,838,449 | Porter | Dec. 29, 1931 |
| 2,157,343 | Mateer et al. | May 9, 1939 |
| 2,238,726 | Feisst | Apr. 15, 1941 |
| 2,259,486 | Carpenter | Oct. 21, 1941 |
| 2,324,172 | Parkhurst | July 13, 1943 |
| 2,325,516 | Holt et al. | July 27, 1943 |
| 2,347,682 | Gunness | May 2, 1944 |